(12) United States Patent
Jacob

(10) Patent No.: US 8,257,817 B2
(45) Date of Patent: Sep. 4, 2012

(54) EXERCISE GRID

(76) Inventor: David Joseph Jacob, Decatur, AL (US)

( * ) Notice: Subject to any disclaimer, the term of this patent is extended or adjusted under 35 U.S.C. 154(b) by 295 days.

(21) Appl. No.: 12/818,584

(22) Filed: Jun. 18, 2010

(65) Prior Publication Data

US 2010/0323149 A1    Dec. 23, 2010

Related U.S. Application Data

(60) Provisional application No. 61/219,512, filed on Jun. 23, 2009.

(51) Int. Cl.
*A63B 69/00* (2006.01)
(52) U.S. Cl. .......... 428/110; 428/107; 473/440
(58) Field of Classification Search .......... 428/107, 428/109, 110; 473/440; 482/14, 51, 148
See application file for complete search history.

(56) References Cited

U.S. PATENT DOCUMENTS

| | | | |
|---|---|---|---|
| 3,255,115 A * | 6/1966 | Peterson | 482/148 |
| 4,039,186 A | 8/1977 | Anderson | |
| 5,836,835 A | 11/1998 | Grimsley | |
| 6,387,013 B1 | 5/2002 | Marquez | |
| 6,631,905 B1 | 10/2003 | Slade | |
| 7,108,635 B2 | 9/2006 | Howlett-Campanella | |
| 7,465,263 B1 | 12/2008 | Conrad et al. | |
| 7,874,959 B2 * | 1/2011 | Dieter | 482/51 |
| 2002/0098947 A1 | 7/2002 | Brown | |
| 2004/0214692 A1 | 10/2004 | Koenig | |
| 2004/0229731 A1 | 11/2004 | Mitchell | |
| 2007/0071961 A1 | 3/2007 | Kao | |
| 2007/0088232 A1 | 4/2007 | Corradini | |
| 2007/0226904 A1 | 10/2007 | Huffman | |
| 2008/0096183 A1 | 4/2008 | Cotran et al. | |
| 2009/0119836 A1 | 5/2009 | Sharp | |
| 2009/0181836 A1 | 7/2009 | Schneider | |

* cited by examiner

*Primary Examiner* — Alexander Thomas
(74) *Attorney, Agent, or Firm* — Mark Swanson; Bradley Arant Boult Cummings

(57) ABSTRACT

An exercise grid includes four running strips and four crossing strips. Each running strip connects with each crossing strip at an intersection to form a grid. The running and crossing strips comprise firm rods positioned between pliable intersections. The firm rods positioned between pliable intersections facilitates folding of the grid at the intersections for transport. Placement of the grid on a playing surface allows one to perform various drills using the spaces between the running and crossing strips.

17 Claims, 1 Drawing Sheet

EXERCISE GRID

This application claims priority to U.S. provisional patent application 61/219,512, filed on Jun. 23, 2009 and this application incorporates U.S. provisional patent application 61/219,512 in full.

BACKGROUND OF THE INVENTION

A. Field of the Invention

This invention relates to exercise equipment, and in particular to grids used for agility training.

B. Background of the Invention

Athletes frequently will perform various drills to try and improve their physical performance. In many cases the drills used do not directly involve the sport for which the athlete is training. For example, many football trainers will spend time lifting weights to increase strength, but no one lifts weights during an actual football game. It is well known that many athletes will perform better when they develop certain skills. It is also true that specific drills can be utilized to develop particular skills and capabilities.

Many athletes will use various drills to improve fundamental motion skills. One type of implement which can be used is an exercise ladder. Many different exercise ladders are available, and they can be used in a wide variety of drills to improve the agility, speed, coordination, balance, quickness and other traits of an athlete. In some cases, several tires can be set in a line, and an athlete will run through the tires while stepping in the middle hole as they progress. Alternatively, exercise ladders can be laid on a playing surface and the athlete will perform various drills while moving through the ladder.

Generally, exercise ladders are one or two squares wide. These exercise ladders can be many squares long and they appear somewhat like a standard ladder with rungs lying on the ground. Exercise ladders can lie flat on the ground where they merely serve to mark a particular pattern on the playing surface, or alternatively they can be suspended at some distance above the ground. Frequently, when the exercise ladders are suspended the athlete will be performing drills which encourage lifting the foot before each foot placement.

There are a great many different types of drills which are possible with a simple exercise ladder device. Many of the drills aid an athlete to develop quick motion of the feet, improve coordination, and shorten start time. This can make an athlete quicker and more agile on their feet. For many sports, an athlete may try to increase the speed of the starting motion in any direction from where they are standing. The athlete may desire to begin moving quickly straight behind them or straight forward, or to the left or right, or anywhere in between. The athlete desires a quick start in any possible direction.

One of the best ways to improve performance is to practice the desired motion. Practicing starting in every possible direction can aid an athlete in gaining a quicker start, regardless of the direction in which the athlete will be moving. In many sports, agility and quickness training is one aspect of an overall training program. It is not uncommon for exercise ladders to be used for agility and quickness training for a portion of a practice period, and then other drills and practice techniques are used for the rest of the practice period.

BRIEF DESCRIPTION OF THE INVENTION

An exercise grid includes four running strips and four crossing strips. Each running strip intersects and connects with each crossing strip to form a grid. Running and crossing strips outline squares, and the grid is three squares by three squares for a total of nine squares. The grid includes firm rods and pliable intersections, where the rods extend between adjacent intersections. The use of firm rods and pliable intersections can facilitate rapid setup of the grid for athletic drills.

DETAILED DESCRIPTION

Grid Shape

Figure 1:
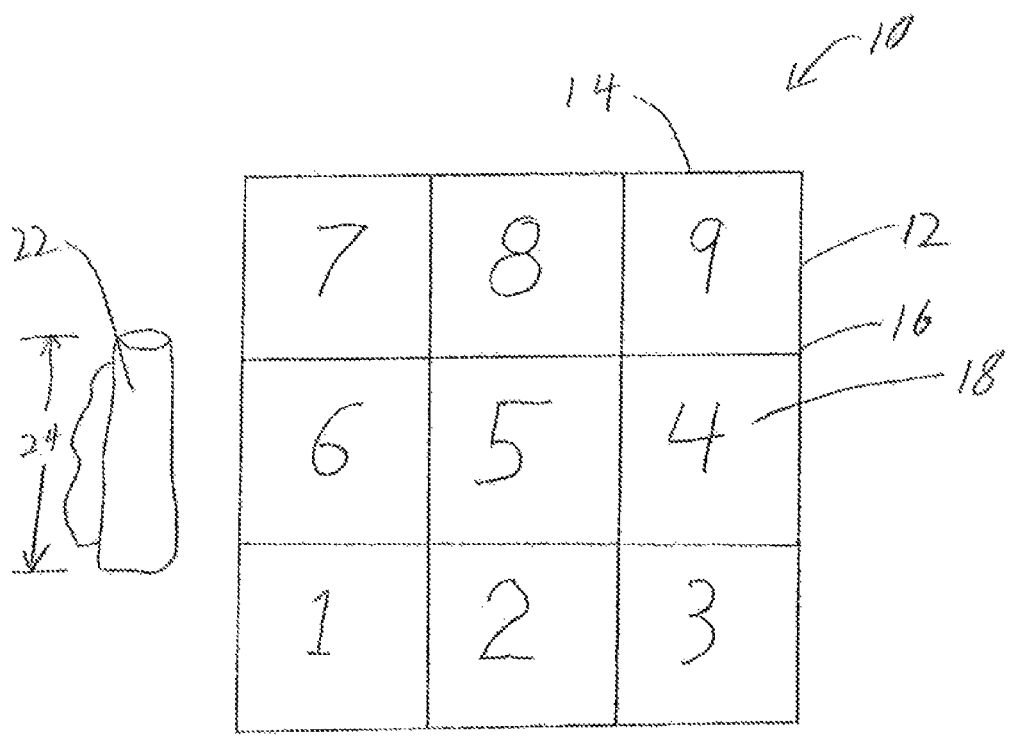
FIG. 1 is a top view of one embodiment of a grid, where the numbers 1-9 are used to indicate individual squares to facilitate the description of specific exercises.

A grid 10 can be used for athletic training drills, as shown in FIG. 1. The grid 10 includes four running strips 12 and four crossing strips 14, where each strip 12, 14 can be positioned in a generally straight line which can intersect several other lines. Either the running strips 12 or the crossing strips 14 can be independently referred to in this description by the more generic term strips 12, 14. Each strip 12, 14 includes the entire generally straight line, even though the line can be broken down into shorter pieces. It may also be possible to position the grid 10 such that a strip 12, 14 does not make a straight line, such as if the grid 10 were folded or laid out erratically. Each strip 12, 14, or line, can have a width and a height, as well as a length. Each running strip 12 is connected to each crossing strip 14 at an intersection 16. At any particular intersection 16 only one running strip 12 and one crossing strip 14 are connected. Therefore, the grid 10 has a total of sixteen intersections 16. Intersections 16 at an outer boundary of the grid 10 form a "T" shape, except at the corners where the intersection 16 forms an "L" shape. Intersections 16 in the interior portions of the grid 10 form an "X" shape.

In use, the grid 10 is typically laid out with the running strips 12 perpendicular to the crossing strips 14. In this format, each of the four running strips 12 is parallel to every other running strip 12, each of the crossing strips 14 is parallel to every other crossing strip 14, and every running strip 12 is perpendicular to every crossing strip 14. It is also possible to lay out the grid 10 under different configurations such that the running strips 12 and the crossing strips 14 are not perpendicular, and even where the strips 12, 14 are not straight. The running strips 12 and crossing strips 14 define a series of quadrilaterals, which in one embodiment can be squares 18. The grid 10 includes nine squares 18, so the grid 10 is said to be a 3×3 grid where the number 3 is referring to the number of squares 18. The squares 18 are open space, or just holes, so an athlete steps directly on a playing surface when stepping in a square 18.

The grid 10 is intended for exercising, so dimensions are established which approximate the average step of a person. Based on experimentation, it has been determined that the squares 18 have dimensions of essentially 20 inches by 20 inches. In this description, the word "essentially" means plus or minus 1 inch unless otherwise specified. The 20 inch by 20 inch square 18 has been found to fit the normal step of people of very different sizes. This is a functional size for very large people, and it is still useful for people having a shorter stature. It has also been found that a grid 10 with 20 inch squares is relatively easy to set up, move, and take down. However, if the squares 18 become much larger than 20 inches it becomes more difficult to manipulate the grid 10 by a single person. A 3×3 grid 10 with 20 inch squares is 5 feet wide, and increasing the square size by just 4 inches gives a grid 10 that is 6 feet wide by 6 feet tall. Completely suspending the grid 10 makes it easier to lay it out, so having a grid 10 that is shorter than most individuals facilitates general handling operations.

The grid 10 also has a height 20 which can generally be less than 2 inches. In some embodiments, the height 20 of the grid 10 is less than essentially 1 inch. The grid 10 can be laid flat on a playing surface, so a relatively short grid height 20 can reduce the potential tripping hazard. When the grid 10 is laid flat on a playing surface, the grid 10 primarily demarcates stepping positions and does not mandate a high step from the athlete. It is also possible to suspend the grid 10 such that an athlete has to step up and over the grid strips 12, 14 to place the athlete's foot within the square 18.

In an alternate embodiment, the grid 10 can be provided with a carrying bag 22 for storage and transport. In some embodiments, the grid 10 can be folded at the intersections 16 and then placed in the carrying bag 22. The carrying bag 22 has a carrying bag length 24 which should be at least as long as the distance between any two adjacent intersections 16, so when the grid 10 is folded it will fit inside the carrying bag 22. In some embodiments, the carrying bag 22 has a carrying bag length 24 at least one inch longer than the distance between two intersections 16 to help the grid 10 fit inside.

Grid Construction

Figure 2:
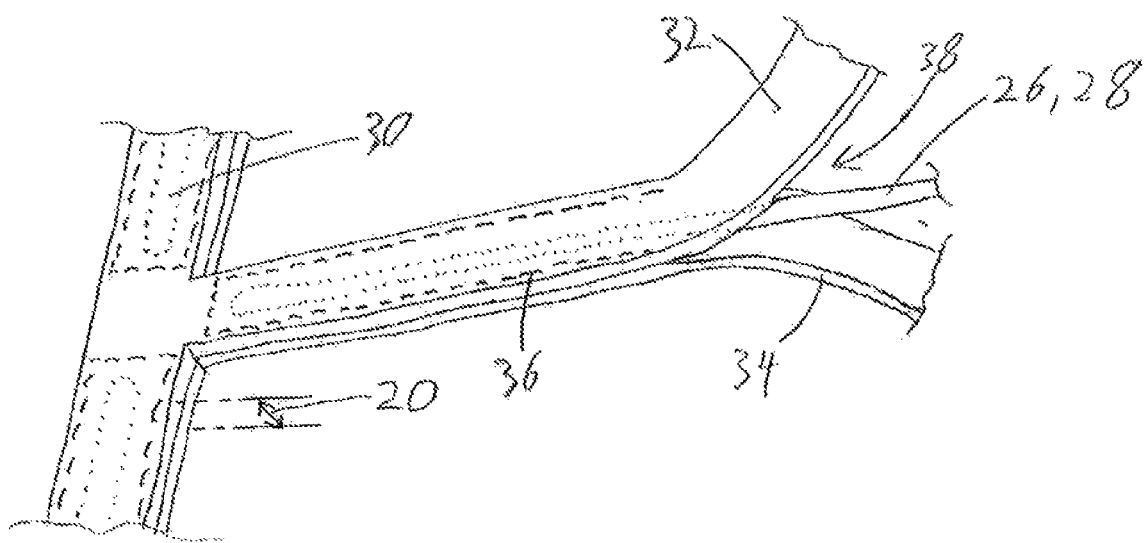
FIG. 2 is a perspective view of one portion of one embodiment of the grid which shows construction details.

The grid 10 is constructed of running strips 12 and crossing strips 14, as seen in FIG. 2, with continuing reference to FIG. 1. The running and crossing strips 12, 14 are joined at sixteen intersections 16. The grid 10 also includes rods 26 which are positioned between the intersections 16. Therefore, in one embodiment there are a total of twenty four rods 26 in the grid 10, because there can be a rod 26 between each adjacent intersection 16. The rods 26 are firm so as to maintain the shape of the grid 10. The rods 26 can have some flexibility such that they will bend somewhat, but the rods generally will try to return to a generally straight shape. Alternatively, the rods 26 can be stiff with very little flexibility. The rods 26 are long, and the rod cross section can be round, flat, oval, or almost any other shape. The rods 26 are incorporated into the running strips 12 and the crossing strips 14, so the rods 26 can be broken down into running strip rods 28 and crossing strip rods 30. In the embodiment where the squares 18 are square, the running strip rods 28 and the crossing strip rods 30 can have the same length.

In one embodiment, the grid 10 includes an upper fabric 32 and a lower fabric 34. The upper and lower fabrics 32, 34 are connected together, and can form a pocket 38 for the rods 26. Stitching 36 can be used to connect the upper and lower fabrics 32, 34, but other connection techniques can also be used, such as gluing, hook and loop connectors, rivets, or other techniques known to those skilled in the art. Stitching 36 can also be used to connect the running and crossing strips 12, 14 at the intersection 16, but other connection techniques can also be used, as previously mentioned. The grid includes running and crossing strips 12, 14, so in this embodiment the upper and lower fabrics 32, 34 are at least a part of the running and crossing strips 12, 14.

The upper fabric 32 can have an upper fabric color and the lower fabric 34 can have a lower fabric color, where the upper fabric color is different than the lower fabric color. Providing different colors on the upper and lower fabrics 32, 34 allows a user to position the grid 10 with either the upper fabric 32 facing up or the lower fabric 34 facing up, as desired. This allows the user to select a color for the grid 10 when in use. Providing contrasting colors can allow for a grid 10 which is useful with a wider variety of playing surface colors while still providing good visibility of the grid 10. In one embodiment, the upper fabric color is red and the lower fabric color is black, but other color choices can also be used.

The upper and lower fabrics 32, 34 should be constructed of a durable material. The grid 10 may be stepped on frequently in use, and the athlete may be wearing cleats or other sharp footwear. The athlete's foot may also be twisted while placed on the grid 10, which can increase the rate of wear and tear. The grid 10 can also be left out in the sunlight for extended periods, so material which is able to withstand ultraviolet light from the sun has certain advantages. In addition, the upper and lower fabric 32, 34 can be somewhat soft such that if an athlete were to fall on the grid 10, the athlete may have a reduced chance for injury from abrasion or cuts. The upper and lower fabrics 32, 34 can be made of flat or tubular webbing, but other materials can be used as well, including but not limited to nylon, cotton, wool, or a wide variety of other materials. In an alternate embodiment, the rods 26 can be positioned inside tubular webbing, so the tubular webbing can replace the upper and lower fabrics 32, 34.

The rods 26 can be positioned in the pocket 38, and extend substantially from one intersection 16 to an adjacent intersection 16. In one embodiment, the rods 26 stop short of each intersection 16 such that the intersection 16 may remain pliable. A pliable intersection 16 allows a user to collect the grid 10 and fold it at the intersection 16. This allows for a very rapid collection and folding of the grid 10 for placement into the carrying bag 22 or for other storage or transport. The firm rods 26 positioned between the intersections 16 allow a user to quickly grasp an end strip 12, 14, and extend the end running or crossing strip 12, 14 such that the grid 10 falls into a shape with the running and crossing strips 12, 14 forming generally right angles to make squares 18. The use of firm rods 26 between pliable intersections 16 facilitates easy, rapid deployment of the grid 10 for drills, as well as easy, rapid take down of the grid 10 for transport or storage.

To form an essentially 20 inch by 20 inch square 18, the use of rods 26 which are essentially 19 inches long can be effective. This provides room for the rods 26 to stop short of the intersection 16, which allows for relatively firm rods 26 and pliable intersections 16. The relatively firm rods 26 combined with the pliable intersections 16 allow the rapid deployment and collection of the grid 10 and facilitate overall use.

There are alternative embodiments of the invention which can provide the invention as described with relatively firm rods 26 and pliable intersection 16. For example, intersections 16 formed of rubber or pliable plastic can be used, where the intersections 16 include cups for insertion of the rods 26. The rods 26 can be made of a wide variety of materials including wooden sticks, plastic rods, PVC pipe, metal bars or a wide variety of other materials. In some embodiments, it is possible for the rods 26 to have an exposed portion such that one can touch and see at least part of the rod 26. An alternative embodiment could include fabric intersections 16 which are stitched or glued to rods 26, or woven through rods 26 of various designs. It is also possible to provide rope intersections 16 which are tied, woven or stitched to a wide variety of rod options. The rods 26 can include a loop on each end for connection to an intersection 16, or the rods 26 can contain holes for connecting to the intersection 16, or many other design possibilities can be used. Other embodiments can also be devised as will be understood by those skilled in the art.

Exercises and Use

One of the best ways for an athlete to improve their ability to move is to practice making the motions they are trying to develop. If an athlete wants to improve their ability to quickly start movement in any direction, or at any angle within the 360 degree circle around the athlete, the athlete can practice motions in every direction. If a grid 10 is to be utilized to practice all these motions, the grid 10 should provide a way to start in every direction. If the athlete stands in the grid square 18 labeled number 5, the athlete can move horizontally in any direction and be stepping into another grid square 18. For this to be possible, the grid 10 has to be at least three squares 18 by three squares 18. This provides a plurality of squares 18 completely surrounding the very center square 18, which is labeled square number 5.

In alternative embodiments it is possible to connect multiple grids 10 together in a wide variety of formats. The grids 10 can be connected all together to form an extended line, or they can be connected in different shapes, such as an L shape or an X shape, as desired. To connect the different grids 10 together it is possible to use several different embodiments. In one embodiment, the grids 10 are simply laid next to each other on the ground, and gravity holds the grids 10 in their approximate position relative to each other. It is also possible to connect the grids 10 with hook and loop straps, or the grids 10 can be provided with snaps, buckles, or other connectors. It is also possible to tie the grids 10 together using a piece of line, or any of a wide variety of other techniques can be used for connecting more than one grid 10 together. Often, the grid 10 is laid flat on the ground, but it is also possible to suspend the grid 10 at some distance off the ground so the athlete must lift their legs for each step.

Providing a single grid 10 with a 3×3 configuration facilitates developing drills to assist the athlete and improve their starting motion in all directions. Minimizing the number of grids 10 needed to establish at least a 3×3 configuration reduces setup time, and reduced setup time can increase the chances that particular drill will be used. An athlete often has limited practice time, so minimizing any setup and take down time increases the time the athlete can actually perform the drills that may improve athletic abilities. A 3×3 configuration is desirable for a training device that develops starting speed in all directions. It usually takes longer to set up multiple components, so providing a single grid 10 with a 3×3 configuration can increase performance by reducing set up time and take down time. Also, providing a grid 10 with firm rods 26 and pliable intersections 16 makes rapid deployment easy, further reducing set up and take down time. When a coach is training a team, increased set up and take down time can become even more undesirable, because every athlete on the team may have to simply wait while the coach sets up a drill. Sports requiring fast starts in every direction are frequently team sports, so a coach is often training several athletes at once. This increases the value of a single device that provides a 3×3 configuration, and can be quickly set up and taken down.

In use, the athlete will frequently start in what is referred to as the athletic position. In this position, the athlete has their feet underneath their shoulders, the knees are slightly bent, and the athlete is balanced, looking forward with the shoulders over the hips and the head over the shoulders. One exercise which the athlete can do to improve starting ability in all directions is to begin in the athletic position in square number 5. The first motion is to hop with both feet from square 5 to square 9 and then hop back to square 5. The athlete then immediately hops from square 5 to square 8 and then back to square 5. Immediately thereafter the athlete hops from square 5 to square 7 and back to square 5. Then to square 6 and back to square 5, and then to square 1 and back to square 5, then to square 2 and back to square 5, then to square 3 and back to square 5, and finally to square 4 and back to square 5. This drill has the athlete hopping in all directions from their initial starting position. Variations of this drill include using just the right foot and then just the left foot for the hopping motion. This drill can strengthen the athlete and improve reaction ability, power, speed, agility, balance and coordination.

The grid 10 can be used for many different drills. As a simple example, other possible drills include a drill called the clockwise rotation, where the athlete begins in square 7, hops to square 8, then to square 9, then to square 4, then to square 3, then to square 2, then to square 1, and then to square 6. The counterclockwise option can also be used where the athlete begins in square 9 and hops to square 8, and then to square 7, then to square 6, then to square 1, then to square 2, then to square 3, and then to square 4. The athlete can perform a basket weave where they hop from square 1 to square 2, then to square 3, then to square 4, then to square 5, then to square 6, then to square 7, then to square 8, and then to square 9. For a different basket weave, the athlete can begin in square 1 and hop to square 6, then to square 7, then to square 8, then to square 5, then to square 2, then to square 3, then to square 4, and then to square 9. These can all be done where the athlete hops on both feet, or just the left foot, or just the right foot, or alternating between the left to right foot, or any of a wide variety of other possibilities.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

The invention claimed is:

1. An exercise grid comprising:
an upper fabric having an upper fabric color;
a lower fabric having a lower fabric color different than the upper fabric color, where the lower fabric is connected to the upper fabric, and where the upper and lower fabrics form:
Four running strips;
Four crossing strips;
Sixteen intersections, where each running strip is connected to each crossing strip at one intersection such that the running and crossing strips form a grid;
twenty four rods positioned between the upper fabric and lower fabric, where each rod extends substantially from one intersection to an adjacent intersection, where each rod stops short of each intersection, where each rod has a length of substantially nineteen inches such that the grid forms nine equal sized squares having sides of essentially twenty inches;
a carrying bag having a length of at least twenty inches for carrying the grid when folded; and
where the exercise grid has a height less than two inches.

2. An exercise grid comprising:
Four running strips, where each running strip has three running strip rods, and where the rods are firm;
Four crossing strips, where each crossing strips has three crossing strip rods, and where the rods are firm; and
Sixteen intersections, where the intersection is where one crossing strip connects to one running strip, where each crossing strip is connected to each running strip to form a grid of nine squares, where one running strip rod is positioned between adjacent intersections in each running strip and one crossing strip rod is positioned between adjacent intersections in each crossing strip, and where the intersections are pliable, and further comprising an upper fabric and a lower fabric connected together, where the running strip rods and the crossing strip rods are positioned between the upper and lower fabric, and where the upper fabric has a color different than the lower fabric.

3. The exercise grid of claim 2 where each intersection is formed by one running strip and one crossing strip.

4. The exercise grid of claim 2 where each running strip rod and each crossing strip rod have essentially the same length.

5. The exercise grid of claim 2 where the running and crossing strip rods have a length of essentially nineteen inches, and where the grid defines nine squares having sides of essentially twenty inches.

6. The exercise grid of claim 2 further comprising a carrying bag having a length of at least twenty inches for carrying the exercise grid when folded at the intersections.

7. The exercise grid of claim 2 where the running strip rods and the crossing strip rods are essentially straight.

8. The exercise grid of claim 2 where the grid has a height which does not exceed two inches.

9. The exercise grid of claim 2 where at least a portion of the running strip rods and the crossing strip rods is exposed.

10. An exercise grid comprising:
    an upper fabric;
    a lower fabric connected to the upper fabric, where the upper fabric has an upper fabric color, and the lower fabric has a lower fabric color different than the upper fabric color, and where the upper and lower fabrics form;
    Four running strips;
    Four crossing strips;
    Sixteen intersections, where each running strip is connected to each crossing strip at one intersection such that the running and crossing strips form a grid; and
    a plurality of rods positioned between the upper fabric and lower fabric, where each rod extends substantially from one intersection to an adjacent intersection, and where each rod stops short of each intersection.

11. The exercise grid of claim 10 where each intersection is formed by one running strip and one crossing strip.

12. The exercise grid of claim 10 where each rod has essentially the same length.

13. The exercise grid of claim 12 where each rod has a length of essentially nineteen inches, and where the grid defines nine squares having sides of essentially twenty inches.

14. The exercise grid of claim 10 where the running and crossing strip rods have a length of essentially nineteen inches, and where the grid defines nine squares having sides of essentially twenty inches.

15. The exercise grid of claim 10 further comprising a carrying bag having a length of at least twenty inches for carrying the exercise grid when folded at the intersections.

16. The exercise grid of claim 10 where the rods are essentially straight.

17. The exercise grid of claim 10 where the grid has a height which does not exceed two inches.

* * * * *